May 26, 1964   HANS JOACHIM SCHWERDHÖFER   3,134,274
MULTIPLE SPEED BICYCLE HUB WITH SELF-CONTAINED
SPEED CHANGE MECHANISM
Filed April 6, 1962                                      2 Sheets-Sheet 1
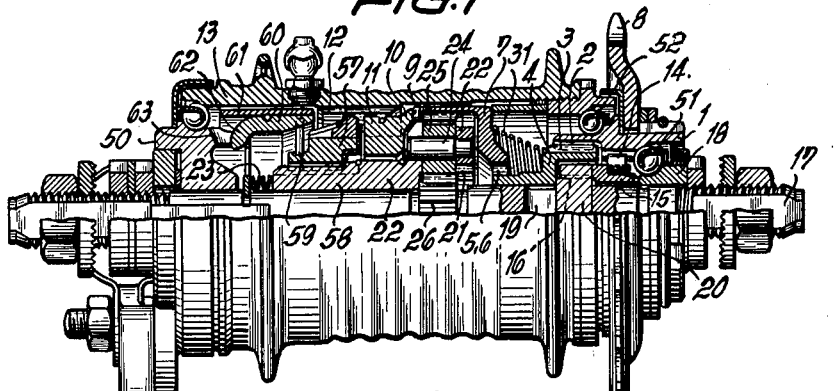
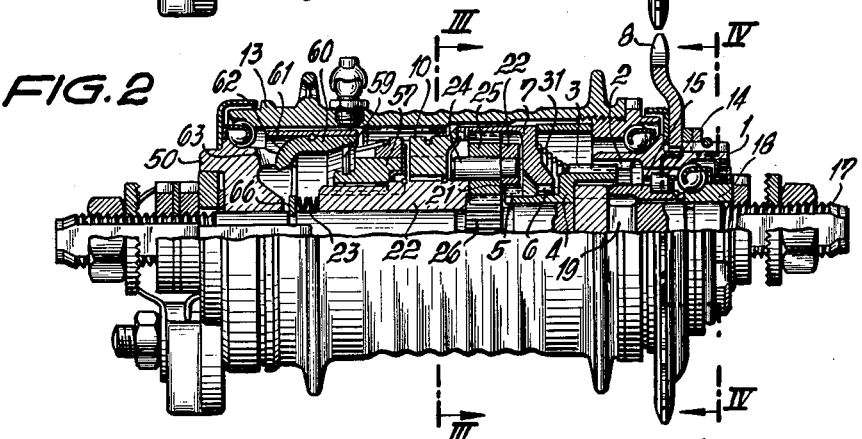
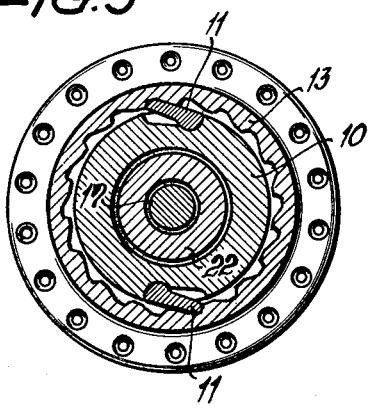
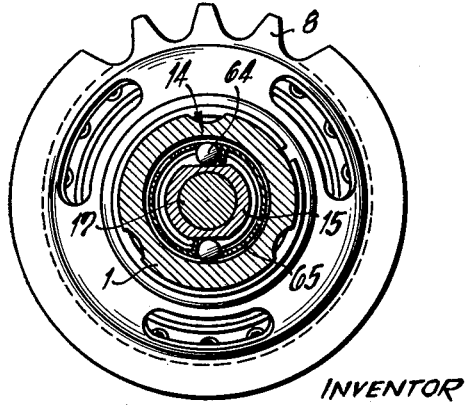
INVENTOR
Hans Joachim Schwerdhöfer May 26, 1964 HANS JOACHIM SCHWERDHÖFER 3,134,274
MULTIPLE SPEED BICYCLE HUB WITH SELF-CONTAINED
SPEED CHANGE MECHANISM
Filed April 6, 1962 2 Sheets-Sheet 2

INVENTOR
Hans
Joachim Schwerdhöfer
By Richard Ernst Agt

United States Patent Office 3,134,274
Patented May 26, 1964

3,134,274
MULTIPLE SPEED BICYCLE HUB WITH SELF-CONTAINED SPEED CHANGE MECHANISM
Hans Joachim Schwerdhöfer, Schweinfurt (Main), Germany, assignor to Fichtel & Sachs A.G., Schweinfurt (Main), Germany, a corporation of Germany
Filed Apr. 6, 1962, Ser. No. 185,729
Claims priority, application Germany Apr. 7, 1961
13 Claims. (Cl. 74—750)

This invention relates to multiple speed hubs for bicycles and the like, and more particularly to a multiple speed hub with a self-contained speed change mechanism which is actuated by back-pedaling.

Known multiple speed bicycle hubs of the type described are relatively complex devices in which a motion transmitting train involving a relatively large number of parts causes speed changes when the pedals of the bicycle are moved backward. The known devices are relatively voluminous, and thus increase the diameter of the hub in an undesirable manner. They also make it necessary to weaken the stationary hub shaft by a plurality of slots and by an axial bore to provide space for the motion transmitting mechanism.

A primary object of this invention is the provision of a multiple speed hub which is of greater simplicity than the known devices, thus lower in initial cost and inherently more durable.

Another object is a multiple speed hub which can be housed in a shell of small overall dimensions.

A further object is a speed change mechanism in which the positions of the constituent elements are closely defined by mutual abutment under spring pressure to avoid wear and lost motion.

Other objects and many of the attendant advantages of this invention will be readily appreciated as the same becomes better understood by reference to the following detailed description when considered in connection with the accompanying drawing wherein:

FIG. 1 shows a two-speed hub of the invention in a front elevational, partly axially sectional view, the hub being shown set for normal speed;

FIG. 2 shows the hub of FIG. 1 in over-drive speed;

FIG. 3 shows a radial section of the hub of FIG. 2 taken on the line III—III;

FIG. 4 is a radially sectional view of the hub of FIG. 2 taken on the line IV—IV;

Figure 5:
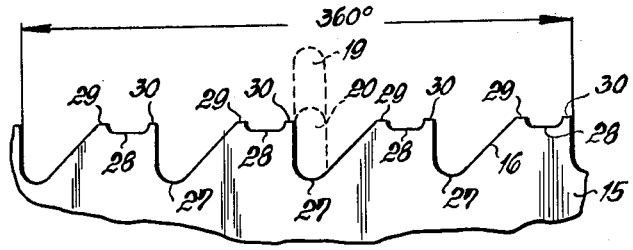
FIG. 5 is a conventional developed view of a speed control cam of the hub of FIGS. 1 and 2.

Referring now to the drawing in detail and initially to FIG. 1, there is shown a wheel hub having the external appearance of hubs commonly employed for bicycle wheels having wire spokes. The hub is mounted on a stationary shaft 17 the ends of which are normally retained in a fork of a bicycle frame. The internal race members 18 and 50 of two ball bearings are fixedly mounted on respective axial end portions of the shaft 17. A tubular driver member 1 is rotatably mounted on the ball bearing member 18 by means of bearing balls 51. The driver member 1 is fixedly connected to a sprocket 8 over which a drive chain of the bicycle is adapted to be trained. A hub shell 13 is rotatably supported at its axial ends by means of two sets of bearing balls 52 on the driver member 1 and on the bearing member 50 respectively.

A planetary gearing is provided within the hub shell 13. The planetary gearing includes a fixed sun wheel 26 on the shaft 17, a planet wheel carrier 22 which has a tubular hub portion rotatable on the shaft 17, a plurality of bearing pins 24 circumferentially spaced on the carrier 22 and each carrying a planet wheel 25 meshingly engaging the sun wheel 26, and a cup-shaped ring gear 7 meshing with the planet wheels. A claw coupling 9 connects the ring gear 7 with a pawl carrier 10. Two pawls 11 are mounted on diametrically opposite portions of the pawl carrier 10 and engage an internal ratchet 12 integral with the hub shell 13, as better seen in FIG. 3. The pawl carrier 10 is freely rotatable on the tubular hub portion of the hub carrier 22.

A flat thread 58 on the hub portion of the planet carrier 22 engages a mating internal thread on a brake cone 57 which thereby moves axially on the planet carrier 22 when it rotates relative thereto. A leaf spring 59 frictionally engages the brake cone 57 and counteracts rotation of the brake cone relative to the fixed elements of the hub. A conical face of the brake cone is engageable by axial movement of the latter with an internal conical face 60 of a slotted brake sleeve 61. The sleeve 61 has a lug 62 which projects radially inward and engages an axial slot 63 of the fixed internal bearing member 50 to prevent rotation of the sleeve 61. The leaf spring 59 is fastened to the brake sleeve 61.

A coupling sleeve 4 is interposed between the planetary gearing and the driver member 1 to transmit the motion of the latter to the former. The coupling sleeve is rotatable and axially slidable on the shaft 17. It has a first set of circumferentially spaced external teeth or splines 3 which permanently engages a corresponding set of internal teeth 2 of the driver member 1. The teeth or splines 2 and 3 have such an axial length that engagement is maintained when the sleeve 4 axially moves relative to the driver member. A second set of external teeth 5 of the coupling sleeve 4 is selectively engageable either with internal teeth 6 of the teeth 7 or internal teeth 21 of the planet carrier 22 by axial movement of the coupling sleeve 4. A helical compression spring 31 is interposed between the ring gear 7 and the coupling sleeve 4. The axial position of the gear ring 7 is substantially fixed, and the spring 31 tends to urge the coupling sleeve into the axial position of the latter in which the external teeth 5 engage the teeth 6 of the ring gear 7.

As best seen by simultaneous consideration of FIGS. 2 and 4, a free-wheeling clutch is arranged within the axial cavity of the driver member 1 immediately adjacent the bearing member 18. The free wheeling clutch 14 essentially consists of two clamping rollers 64 and a cage 65 limiting circumferential movement of the clamping rollers in one direction to two diametrically opposite positions. A tubular speed control sleeve 15 has two flats formed in its outer face, and the clamping rollers 64 cooperate with the flat face portions of the sleeve 15 in such a manner that the sleeve partakes of the rotary movement of the driver member 1 when the same is rotated by the sprocket 8 in a backward direction, that is, during back pedaling of the bicycle. The portion of the driver member 1 in contact with the rollers 64 thus constitutes the input portion of a one-way clutch arrangement the output portion of which is constituted by the sleeve 15.

The speed control sleeve 15 carries a speed control cam 16 the radial face of which cooperates with a speed control block 20. The block is axially movable in a slot 19 of the shaft 17 within a radially expanded portion of the axial bore of the coupling sleeve 4. An internal shoulder of the sleeve abuts against the block 20 under the pressure of the spring 31.

As shown in FIG. 1, the hub is set for operation in its lower speed in which the torque developed by the chain engaging the sprocket 8 is transmitted by the drive member 1, the coupling sleeve 4, the ring gear 7, the claw coupling 9, to the pawl carrier 10, and thence to the hub shell 13. As seen in FIG. 2, the hub is arranged for operation in overdrive, that is, in such a manner that the hub shell rotates at a greater speed than the sprocket 8. In this position, torque is transmitted from the sprocket 8 through the driver member 1, the coupling sleeve 4, the planet carrier 22, the planet wheels 25, the ring gear 7, the claw coupling 9, the pawl carrier 10, and the pawls 11 to the hub shell 13.

Cup springs 23 are axially interposed between the axial end portion of the planet wheel carrier 22 remote from the coupling sleeve 4 and a spring washer 66 which is fastened to the shaft 17. The cup spring 23 permanently urges the planet carrier into abutting axial engagement with the sun wheel 26.

Speed change from the normal to the overdrive position is initiated by backward rotary movement of the driver member 1 when the pedals (not illustrated) of the bicycle are briefly rotated backward. During the backward rotation of the driver member 1, the speed control sleeve 15 is rotated by means of the free-wheeling clutch 14, and the cylindrical cam 16 moves relative to the block 20 which is secured against rotation in the slot 19 as best seen in FIG. 6 in plan view. The cam 16 is shown in a developed view in FIG. 5 in which the block 20 and slot 19 are indicated in a phantom view.

The end face of the cam 16 has four identical circumferential sections, each consisting of a deep notch 27 and a projecting dwell 28. Humps 29, 30 projecting at the circumferential end of each dwell 28 prevent accidental movement of the block 20 from the dwell 18 into either adjacent notch 27. The cam 16 can rotate in one direction only, namely during back pedaling. Each notch 27 is connected to the adjacent dwells 28 by a steeply sloping cam face portion and by a more gradually sloping portion respectively. The block 20 which is urged into abutting engagement with the end face of the cam 16 by the spring 31 acting on the coupling sleeve 4 travels over the cam face in such a direction that it descends over the steeply sloping portion from each dwell 28 to the adjacent notch 27, and ascends therefrom over the more gradually sloping cam portion.

Figure 6:
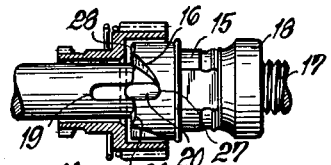
FIG. 6 shows a detail of the hub of FIG. 1 in partly sectional plan view.

When the hub is in the normal speed position in which the hub shell 13 is directly coupled to the sprocket 8 for rotation at the same speed, the block 20 is in the position shown in FIGS. 5 and 6, that is, at the bottom of a notch 27. Upon back-pedaling, the speed control sleeve 15 is rotated by the free-wheeling clutch arrangement 14 in such a manner that the block 20 ascends to an adjacent projecting dwell 28 and axially shifts the coupling sleeve 4 from the position illustrated in FIG. 1 into that shown in FIG. 2. The set of teeth 5 of the sleeve is thereby disengaged from the ring gear 7 and brought into engagement with the internal teeth 21 on the planet carrier 22. This engagement is facilitated by the cup spring 23 which permits a slight axial movement of the planet carrier 22 away from its normal position of axial abutment against the sun wheel 26. The axial edges of the teeth 5 and 21 are slightly tapered, and engage readily during the short common axial movement made possible by the spring 23.

When the bicycle pedals are rotated backward a second time, the hub is returned to the position of its elements illustrated in FIG. 1. Rotation of the cam 16 during backward rotation of the driver member 1 causes the block 20 to surmount the hump 30 and to drop over the steeply sloping side of the next notch 27 under the pressure of the spring 31. The coupling sleeve moves into that position in which its teeth 5 engages the internal teeth 6 of the ring gear 7.

With the cam 16 illustrated, the change from one speed to the other requires backward rotation of the driver member through one eighth of a revolution, or an arc of 45°. Because of the usual transmission ratio between the pedals and the hub sprocket of a bicycle, the hub will shift from one speed to the other when the pedals are rotated backward over a fraction of such an arc. The number of identical circumferential cam sections may be varied to suit requirements, but an even number of sections is preferred.

The slot 19 is preferably of such length that the block 20 abuts against a radial wall of the slot in the two terminal positions of its axial movement. The rotary movement of the cam 16 may be transformed into axial movement of the coupling sleeve 4 by means other than a block moving in an axial slot of the shaft 17 without departing from the spirit of the invention. If the dimensions of the shaft 17 are such as to make it inadvisable to weaken it by slotting, a tubular member having an axial guide slot engaged by a pin fixed on the shaft 17 and radially projecting therefrom may be substituted for the block 20, and other modifications will readily suggest themselves to those skilled in the art where special conditions may require them. It will also be evident that a cam may be mounted on the block 20 and be engaged by a cam follower portion of the control sleeve 15 without basically changing the operation of the device. The arrangement illustrated and discussed above in more detail is preferred, however, because of its great simplicity and reliability.

The increased resistance to back pedaling sensed when the block 20 engages one of the humps 29, 30 of the cam 16 after speed change may provide sufficient indication to the rider of the bicycle to prevent him from continuing back pedaling beyond the required arc, which would again shift the hub into the original speed position. In a hub equipped with a coaster brake, also operated by back pedaling, such accidental multiple speed changes can be prevented in a different manner not dependent on the skill of the operator.

Back-pedaling because of the consequent backward rotation of the driver member 1 causes backward rotation of the planetary gearing and of the pawl carrier 10. The ratchet 13 overrides the pawls 11 whenever the speed of the hub shell 13 is greater than that of the pawl carrier 10, and the hub shell does not participate in the backward rotary movement.

During forward rotation of the hub, the friction of the spring 59 urges the brake cone 57 into threaded movement on planet carrier 22 toward a terminal position adjacent the sprocket 8 in which the brake cone is arrested by abutment against a portion of the planet carrier 22. During back-pedaling, the friction of the leaf spring 59 causes the brake cone 57 to move on the planet carrier 22 in a direction away from the sprocket 8 and into engagement of its conical face with the corresponding conical face 60 of the brake sleeve 61. The pitch of the threads 58 and the stroke of axial movement of the brake cone 57 are selected in such a manner that backward rotation of the driver member 1 through an arc greater than that required to turn the cam 16 through 45° will engage the brake, and that brake engagement is completed by back pedaling insufficient to cause two successive speed changes, that is, movement of the cam 16 through an arc smaller than 90°.

An involuntary return from a changed speed to the original speed is thus safely prevented. After the speed of the hub has been changed once, the next speed change can only be initiated by forward pedaling to return the brake cone 57 toward its inoperative position nearer the sprocket 8, and subsequent back pedaling. It is inherent in this arrangement that the hub speed is changed whenever the brake is actuated, but the need for again changing the speed upon release of the brake has been found to be entirely acceptable, and to be outweighed by far by the inherent advantages of a hub of the type described which provides multiple speed selection and a very effective brake without any control cables or other external control equipment.

Figure 7:
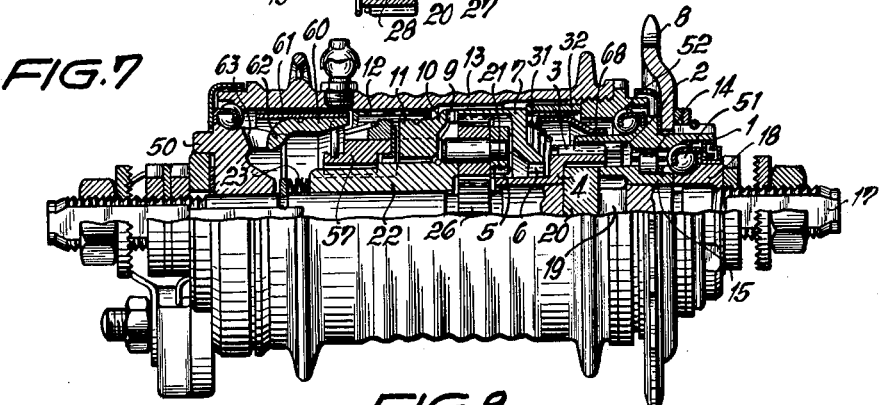
FIG. 7 shows a modified embodiment of the invention in a view corresponding to that of FIGS. 1 and 2.

The modified embodiment of the invention shown in FIG. 7 is closely similar to that seen in FIG. 2. It provides an axial abutment for the spring 31 which is independent of the planetary gearing. A ring 68 on the drive member 1 holds a flaring tubular sleeve 32 which axially extends from the ring 68 toward the planetary gearing. The end portion of the spring 31 remote from the coupling sleeve 4 is secured to a corresponding end portion of the sleeve 32. This arrangement avoids sliding friction between the spring 31 and the ring gear 7 when the coupling sleeve 4 and the ring gear rotate at different speeds as is inherent in the operation of the hub in over-drive. This modification does not alter any other aspect of the operation of the hub.

Figure 8:
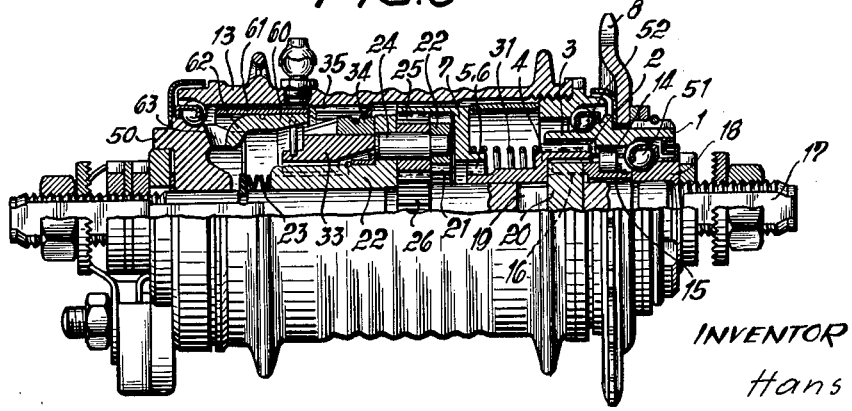
FIG. 8 shows an additional embodiment of the invention in a similar view.

The embodiment of the invention illustrated in FIG. 8 provides a second speed which is slower than the normal speed in which the hub shell 13 and the sprocket 8 are directly for joint angular displacement. Instead of the motion transmitting pawl arrangement 10, 11 which is directly coupled to the ring gear 7 of the planetary gear train in the embodiments of the invention illustrated in FIGS. 1 to 7, the embodiment illustrated in FIG. 8 is equipped with a brake cone 33 similar to the brake cone 57, but of adequate axial length to fixedly support a pawl carrier 34 whose pawls cooperate with a ratchet 35 on the hub shell 13.

In the illustrated slow speed position of the hub of FIG. 8, torque is transmitted from the sprocket 8 by way of the driver member 1, the coupling sleeve 4, the ring gear 7, the planet wheels 25, the planet carrier 22, the brake cone 33, the pawl carrier 34 to the hub shell 13. In the non-illustrated normal operating position of the hub, torque is transmitted from the sprocket 8 through the driver member 1, the coupling sleeve 4, the planet carrier 22, the brake cone 33 and the pawl carrier 34 to the hub shell 13 which rotates at the same speed as the sprocket 8. Speed change is effected in the same manner as described above.

The several embodiments of the invention illustrated provide speed change by back pedaling in a particularly simple manner. The speed change mechanism has only a few parts which are sturdy, yet occupy a minimum of space. They lend themselves to an arrangement in which the elements of the speed change mechanism are contained within axial cavities of necessary other elements of the multiple speed hub which are of relatively small diameter so that the addition of the speed change mechanism adds neither to the axial nor to the radial dimensions of the space required within a substantially cylindrical hub shell. A multiple speed hub of the invention equipped for speed change by back pedaling need not be bulkier than an otherwise similar multiple speed hub not equipped for such a speed change operation.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A multiple speed hub for a bicycle and the like, comprising in combination:
   (a) a shaft having an axis;
   (b) a gear train mounted on said shaft and including a plurality of gear means in mutual engagement for rotation at different respective speeds;
   (c) a driver member adapted to rotate on said shaft about said axis in a forward direction and a backward direction;
   (d) a coupling member in engagement with said driver member and movable between a plurality of positions in which said coupling member engages respective ones of said gear means for transmitting rotary movement of said driver member to said gear train;
   (e) speed control means operatively connected to said driver member and to said coupling member for moving said coupling member between said positions thereof responsive to backward rotation of said driver member through a first arc;
   (f) hub shell means supported on said shaft for rotation about said axis;
   (g) motion transmitting means interposed between one of said gear means and said hub shell means for rotating said hub shell means when said driver member rotates in said forward direction;
   (h) brake means fixed on said shaft and engageable with said shell means; and
   (i) brake actuating means responsive to backward rotation of said driver member through a second arc for engaging said brake means with said hub shell means and for thereby arresting relative movement of said shaft and of said hub shell means, said second arc being greater than said first arc, and smaller than twice said first arc.

2. A hub as set forth in claim 1, wherein said coupling member moves axially between said positions thereof, and said speed control means includes an axially movable speed control member engaging said coupling member for joint axial movement, rotary one-way clutch means having an input and an output portion connected for selective joint rotation in one direction only, said input portion being connected to said driver member for joint rotation therewith, and cam means interposed between said output portion and said speed control member for moving the speed control member axially when said output portion rotates with said input portion.

3. A hub as set forth in claim 2, wherein said cam means is integral with said output portion.

4. A hub as set forth in claim 2, further comprising resilient means for permanently urging said coupling member into axially abutting engagement with said speed control member.

5. A multiple speed hub for a bicycle and the like, comprising, in combination:
   (a) a shaft having an axis and two axially terminal portions;
   (b) a bearing on each of said portions;
   (c) a driver member mounted on one of said bearings for alternative rotation about said axis in a forward and in a backward direction;
   (d) an axially elongated hub shell having two longitudinal end portions respectively rotatably supported on the other one of said bearings and on said driver member;
   (e) a gear train mounted on a portion of said shaft intermediate said terminal portions and including a plurality of gear means in mutual engagement for rotation at different respective speeds;
   (f) a coupling member in engagement with said driver member and axially movable between a plurality of positions in which said coupling member selectively engages respective ones of said gear means for transmitting rotary movement of said driver member to said gear train;
   (g) motion transmitting means interposed between one of said gear means and said hub shell for selectively rotating said hub shell when said driver member rotates in said forward direction;
   (h) an axially reciprocable speed control member engaging said coupling member for joint axial movement;
   (i) rotary one-way clutch means having an input and an output portion connected for selective joint rotation in one direction, said input portion being integral with said driver member for rotation in said one direction when said driver member rotates in said backward direction;
   (j) cam means operatively connected to said output portion and engaging said speed control member for reciprocating the speed control member axially when said output member rotates, whereby said coupling member is reciprocated between said plurality of positions thereof when said driver member rotates in said backward direction through a first arc;

(k) brake means fixed on said shaft and engageable with said hub shell; and (l) brake actuating means responsive to rotation of said driver member in said backward direction through a second arc greater than said first arc for engaging said brake means with said hub shell, and for thereby arresting relative movement of said shaft and of said hub shell, said second arc being smaller than twice said first arc.

6. A hub as set forth in claim 5, wherein said one-way clutch means is axially contiguously adjacent the bearing on said one terminal portion of said shaft.

7. A hub as set forth in claim 5, further comprising resilient means for permanently urging said coupling member to move axially into abutting engagement with said speed control member.

8. A hub as set forth in claim 5, wherein said cam means includes a cylindrical cam having an end face formed with a plurality of circumferentially spaced notches extending axially inward of said cam, and a dwell intermediate two adjacent ones of said notches, said cam having an axially outwardly extending projection separating said dwell from an adjacent notch, and means for resiliently urging said speed control member into abutting engagement with said end face.

9. A multiple speed hub for a bicycle and the like, comprising, in combination:

(a) a shaft having an axis and two axially terminal portions;

(b) a bearing on each of said portions;

(c) a driver member mounted on one of said bearings for alternative rotation about said axis in a forward and in a backward direction;

(d) an axially elongated hub shell having two longitudinal end portions respectively rotatably supported on the other one of said bearings and on said driver member;

(e) a gear train mounted on a portion of said shaft intermediate said terminal portions and including a plurality of gear means in mutual engagement for rotation at different respective speeds, one of said gear means being axially movable on said shaft toward and away from a predetermined position;

(f) a coupling member in engagement with said driver member and axially movable between a plurality of positions in which said coupling member selectively engages respective ones of said gear means for transmitting rotary movement of said driver member to said gear train;

(g) resilient means permanently urging said one gear means to move toward said predetermined position in a predetermined axial direction, said one gear means being engageable with said coupling member by axial movement of the latter in a direction opposite to said predetermined axial direction;

(h) motion transmitting means interposed between one of said gear means and said hub shell for selectively rotating said hub shell when said driver member rotates in said forward direction;

(i) an axially reciprocable speed control member engaging said coupling member for joint axial movement;

(j) rotary one-way clutch means having an input and an output portion connected for selective joint rotation in one direction, said input portion being integral with said driver member for rotation in said one direction when said driver member rotates in said backward direction; and (k) cam means operatively connected to said output portion and engaging said speed control member for reciprocating the speed control member axially when said output member rotates, whereby said coupling member is reciprocated between said plurality of positions thereof when said driver member rotates in said backward direction.

10. A hub as set forth in claim 9, wherein said resilient means includes a cup spring.

11. A multiple speed hub for a bicycle and the like, comprising, in combination:

(a) a shaft having an axis and two axially terminal portions;

(b) a bearing on each of said portions;

(c) a driver member mounted on one of said bearings for alternative rotation about said axis in a forward and in a backward direction;

(d) an axially elongated hub shell having two longitudinal end portions respectively rotatably supported on the other one of said bearings and on said driver member;

(e) a gear train mounted on a portion of said shaft intermediate said terminal portions and including a plurality of gear means in mutual engagement for rotation at different respective speeds;

(f) a coupling member in engagement with said driver member and axially movable between a plurality of positions in which said coupling member selectively engages respective ones of said gear means for transmitting rotary movement of said driver member to said gear train, said coupling member being formed with an axial bore, said shaft passing through said bore;

(g) motion transmitting means interposed between one of said gear means and said hub shell for selectively rotating said hub shell when said driver member rotates in said forward direction;

(h) an axially reciprocable speed control member engaging said coupling member for joint axial movement;

(i) rotary one-way clutch means having an input and an output portion connected for selective joint rotation in one direction, said input portion being integral with said driver member for rotation in said one direction when said driver member rotates in said backward direction, said axial bore of said coupling member having an enlarged axial portion, said speed control member and said output portion being radially enclosed within said enlarged bore portion; and (j) cam means operatively connected to said output portion and engaging said speed control member for reciprocating the speed control member axially when said output member rotates, whereby said coupling member is reciprocated between said plurality of positions thereof when said driver member rotates in said backward direction.

12. A hub as set forth in claim 11, wherein said coupling sleeve has an internal shoulder between said enlarged portion and the remainder of said bore, said speed control member abuttingly engaging said shoulder.

13. A multiple speed hub for a bicycle and the like, comprising, in combination:

(a) a shaft having an axis and two axially terminal portions;

(b) a bearing on each of said portions;

(c) a driver member mounted on one of said bearings for alternative rotation about said axis in a forward and in a backward direction;

(d) an axially elongated hub shell having two longitudinal end portions respectively rotatably supported on the other one of said bearings and on said driver member;

(e) a gear train mounted on a portion of said shaft intermediate said terminal portions and including a plurality of gear means in mutual engagement for rotation at different respective speeds;

(f) a coupling member in engagement with said driver member and axially movable between a plurality of positions in which said coupling member selectively engages respective ones of said gear means for transmitting rotary movement of said driver member to said gear train;

(g) motion transmitting means interposed between one of said gear means and said hub shell for selectively rotating said hub shell when said driver member rotates in said forward direction;

(h) an axially reciprocable speed control member engaging said coupling member for joint axial movement;

(i) rotary one-way clutch means having an input and an output portion connected for selective joint rotation in one direction, said input portion being integral with said driver member for rotation in said one direction when said driver member rotates in said backward direction;

(j) cam means axially interposed between said output portion and said speed control member for reciprocating the speed control member axially when said output member rotates, said speed control member being axially interposed between said coupling member and said cam means; and (k) a yieldably resilient member engaging one of said gear means and said coupling member and axially urging said coupling member, said speed control member, and said cam means away from the engaged gear means and into abutting engagement with each other whereby said coupling member is reciprocated between said plurality of positions thereof when said driver member rotates in said backward direction.

References Cited in the file of this patent

UNITED STATES PATENTS

| | | |
|---|---|---|
| 836,738 | Copeland | Nov. 27, 1906 |
| 942,220 | Rockwell | Dec. 7, 1909 |
| 942,520 | Rockwell | Dec. 7, 1909 |
| 1,233,600 | Olsen | July 19, 1917 |
| 1,249,657 | Olsen | Dec. 11, 1917 |

FOREIGN PATENTS

| | | |
|---|---|---|
| 640,062 | Great Britain | July 12, 1950 |

OTHER REFERENCES

German application, 1,037,891, Aug. 27, 1958.